(12) United States Patent
Watanabe et al.

(10) Patent No.: US 6,394,637 B1
(45) Date of Patent: *May 28, 2002

(54) PIVOT STRUCTURE OF A VEHICLE LAMP

(75) Inventors: Takao Watanabe; Naoki Kakiuchi, both of Shizuoka (JP)

(73) Assignee: Koito Manufacturing Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/645,180

(22) Filed: Aug. 24, 2000

(30) Foreign Application Priority Data

Aug. 27, 1999 (JP) .......................................... 11-241425

(51) Int. Cl.$^7$ ................................................ F21V 29/00
(52) U.S. Cl. ........................ 362/523; 362/460; 362/504
(58) Field of Search ................................. 362/523, 460, 362/475, 476, 504, 507, 84, 528, 529–532, 421

(56) References Cited

U.S. PATENT DOCUMENTS

| | | | | |
|---|---|---|---|---|
| 4,849,860 A | * | 7/1989 | Schauwecker | 362/523 |
| 5,003,436 A | * | 3/1991 | Yamada et al. | 362/420 |
| 5,951,157 A | | 9/1999 | Shirai et al. | |
| 6,017,137 A | | 1/2000 | Suehiro et al. | |
| 6,019,490 A | | 2/2000 | Kibayashi | |
| 6,086,233 A | | 7/2000 | Maeda et al. | |

* cited by examiner

Primary Examiner—Sandra O'Shea
Assistant Examiner—Bao Truong
(74) Attorney, Agent, or Firm—Koda & Androlia

(57) ABSTRACT

A pivot structure of a vehicle lamp that is tiltably mounted on a vehicle body. The pivot structure includes: a fulcrum member that comprises a threaded shaft portion, a spherical portion and an operating portion; a screw receiving portion formed on the vehicle body so that the threaded shaft portion of the fulcrum member is screwed to the screw receiving portion; a pivot receiving member formed on a vehicle lamp so as to rotatably house the spherical portion of the fulcrum member; and a projecting wall that covers the operation portion of the fulcrum member and prevents the user from making an access to the operating portion with a rotating tool.

9 Claims, 2 Drawing Sheets

PIVOT STRUCTURE OF A VEHICLE LAMP

BACKGROUND OF THE INVENTION

1. Field of the Invention

The present invention relates to a pivot structure of a vehicle lamp, and more particularly, to a pivot structure that can prevent an adjustment of a height of a pivot portion of the vehicle lamp.

2. Prior Art

In a vehicle lamp, especially a vehicle headlamp, it is necessary to adjust its irradiation angle to obtain the most appropriate irradiation of light in front of the vehicle.

However, once the adjustment of the irradiation angle is properly completed at a professional work site such as the auto manufactures and auto workshop, it is preferable that the adjusted irradiation angle is not changed easily.

In other words, it is essential that the user is not allowed to adjust the irradiation angle once the adjustment is completed at, for instance, the manufacturing site.

The U.S. Pat. No. 6,086,233 discloses a mechanism that meets this demand.

This prior art discloses an irradiation angle

This prior art discloses an irradiation angle adjustment mechanism for a vehicle lamp that tilts the vehicle lamp with respect to a vehicle body. This tilting is performed by connecting the vehicle lamp to the vehicle body via an adjustment shaft and by rotating the adjustment shaft so as to adjust the distance between the portion of the lamp connected to the adjustment shaft and the vehicle body. In this mechanism, the adjustment shaft is mounted to the vehicle body via a bracket such that the bracket completely covers the adjustment shaft. When the adjustment shaft is connected to the vehicle lamp, the operation portion of the adjustment shaft is covered by the bracket, and the rotation of the adjustment shaft by the user is avoided by the bracket.

In this mechanism, only the adjustment of the adjustment shaft is not done after the vehicle lamp is mounted to the vehicle body.

Conventionally, a vehicle lamp, that is tiltable with respect to the vehicle body, is supported by the vehicle body at a total of three locations: at interval adjusting portions (for vertical and lateral adjustment) which are the two locations where the distance between the lamp and the vehicle body is adjusted via the adjustment shaft, and at a pivot portion which is a single location that pivotally supports the lamp relative to the vehicle body.

The pivot portion described above comprises a fulcrum member; and this fulcrum member is formed by integrally combining a threaded shaft portion, a spherical portion, and an operation portion with which a tool for rotating operation portion is brought into contact. The threaded shaft portion of the fulcrum member is screwed into a screw receiving portion formed in the vehicle body or in a mounting element of the vehicle body. Also, the spherical portion of the fulcrum member is rotatably housed in the pivot receiving member formed in the vehicle lamp.

Therefore, the interval adjusting portion is generally not adjusted after the fulcrum member is mounted on the vehicle body. Nevertheless, the user can adjust or tilt the vehicle lamp by rotating the operation portion of the fulcrum member at the pivot portion and change the amount of engagement between the threaded shaft portion and the screw receiving portion.

Conventionally, no particular means is employed that can prevent the rotation of the fulcrum portion at the pivot portion.

SUMMARY OF THE INVENTION

Accordingly, the object of the present invention is to provide a structure for supporting a vehicle lamp that can prevent the user from rotating the fulcrum member of the pivot member once the lamp is mounted to a vehicle body.

So as to accomplish the object, the pivot structure of vehicle lamp of the present invention, which is tiltably mounted to a vehicle body or a mounting element of the vehicle body, includes:

a fulcrum member that comprises a threaded shaft portion, a spherical portion, and an operation portion with which a tool for rotating the operation portion is brought into contact;

a screw receiving portion with which the threaded shaft portion of the fulcrum member is screwed, the screw receiving portion being formed in the vehicle body or the mounting element;

a receiving member which rotatably houses the spherical portion of the fulcrum member, the receiving member being formed in the vehicle lamp; and a covering member that covers the operation portion of the fulcrum member.

According to the present invention, the covering member covers the operation portion of the fulcrum member so that it prevents the user from accessing the operation portion once the lamp is mounted to the vehicle body. Thus, the user is prevented from changing the irradiation angle of the vehicle lamp.

DETAILED DESCRIPTION OF THE PREFERRED EMBODIMENTS

Figure 1:
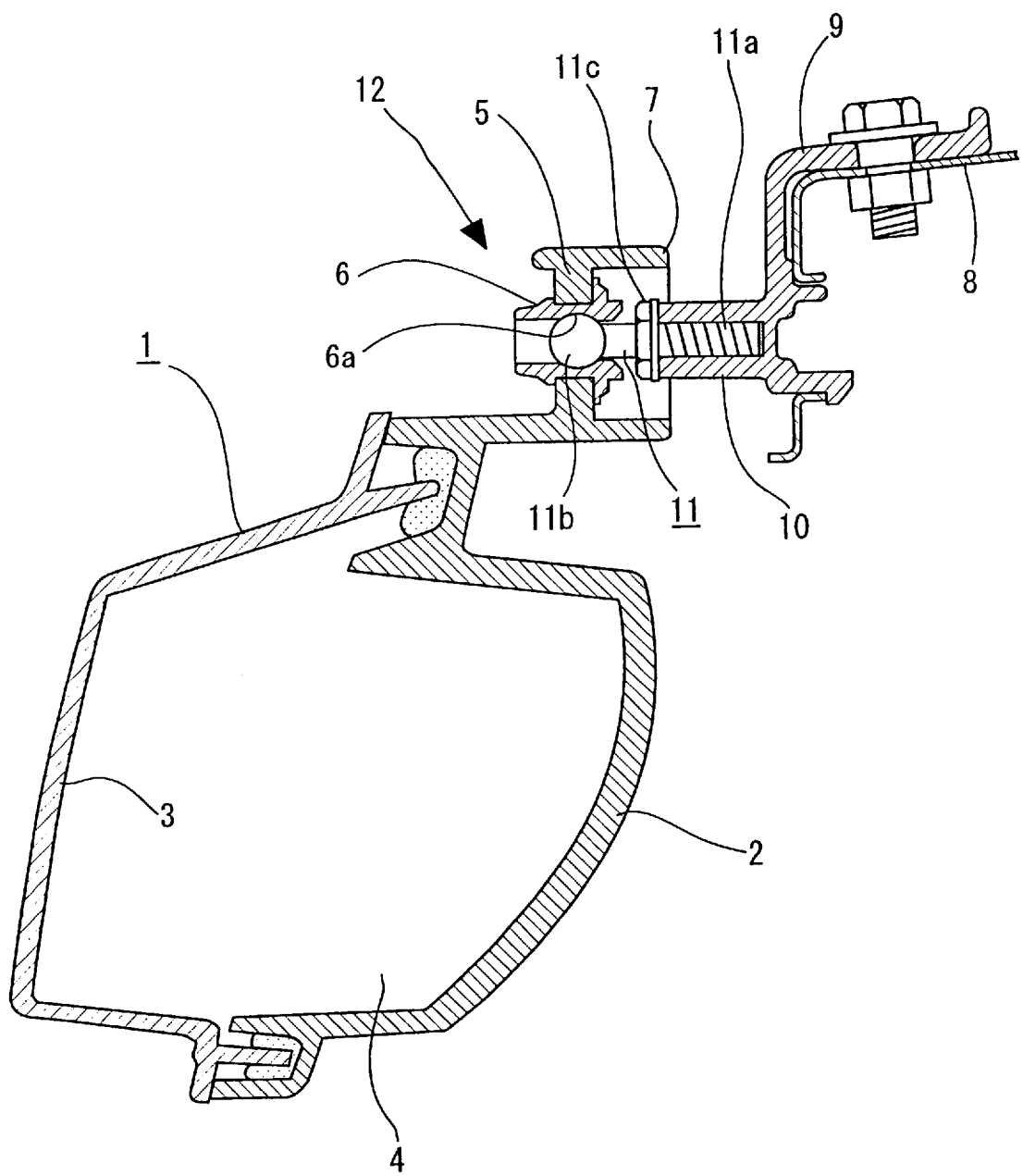
FIG. 1 is a cross sectional view of an essential portion of the pivot structure of a vehicle lamp according to the present invention.

Embodiments of the pivot structure of the vehicle lamp according to the present invention will be described in detail with respect to the accompanying drawings.

The headlamp unit 1 comprises a lamp body 2 and a lens 3 that covers the front surface of the lamp body 2. A light source (not shown) is disposed in a lamp chamber 4 that is defined by the lamp body 2 and the lens 3.

The lamp body 2 is provided with a projecting connecting piece 5 that has therein a pivot receiving member 6. The pivot receiving member 6 is made of a synthetic resin material that has elasticity. In addition, the pivot receiving member 6 has a spherical recessed portion 6a that is open to the rear with a larger diameter than the front. The projecting connecting piece 5 further has a projecting wall 7 that extends rearwards from a position around the area which contains the pivot receiving member 6 and covers the operation portion of a fulcrum member which will be described below. The projecting wall 7 is substantially a cylinder with one end (front end) closed and another end (rear end) opened.

A mounting bracket 9 made of synthetic resin material is attached to a vehicle body 8. The headlamp unit 1 is mounted to the vehicle body 8 via this mounting bracket 9.

The mounting bracket 9 has a screw receiving portion 10 that projects forward (in the direction of the lens 3) like a boss and holds a fulcrum member 11 therein.

The fulcrum member 11 is made of metal and comprises a threaded shaft portion 11a, a spherical portion 11b and an operation portion 11c that are integrally combined into a single body. The operation portion 11c is shaped as, for example, a hexagonal nut and is located between the threaded shaft portion 11a and the spherical portion 11b. When a tool for a rotational operation is engaged with the operation portion 11c and turned, the threaded shaft portion 11a of the fulcrum member 11 is screwed into the screw receiving portion 10 of the mounting bracket 9. The fulcrum member 11 is thus engaged with the screw receiving portion 10 such that the spherical portion 11b extends forward (in the direction of the lens 3) from the screw receiving portion 10.

With the structure described above, the rear opening of the spherical recessed portion 6a of the pivot receiving member 6 attached to the headlamp unit 1 is fitted on the spherical portion 11b of the fulcrum member 11. Then, when the headlamp unit 1 is pressed backward (in the direction opposite from the lens 3), the spherical portion 11b of the fulcrum member 11 is brought into an engagement with the spherical recess portion 6a by the elasticity of the pivot receiving member 6. As a result, the pivot receiving member 6 of the projecting connecting piece 5 is rotatably supported by the spherical portion 11b of the fulcrum member A pivot portion 12 that rotatably supports the headlamp unit 1 is thus obtained. In this pivot portion 12, the operation portion 11c of the fulcrum member 11 is surrounded by the projecting wall 7 formed on the headlamp unit 1. Accordingly, the user cannot access to the operation portion 11c. Thus, since the user cannot turn the fulcrum member 11, the user is prevented from altering the distance between the headlamp unit 1 and the vehicle body 8.

The headlamp unit 1 is mounted on the mounting bracket 9 via an adjustment shaft of two interval adjusting portions (not shown) The interval adjusting portions can be of a known structure, and one that is disclosed in the Japanese Patent Application Laid-Open No. H11-151971 can be employed, for instance.

Figure 2:
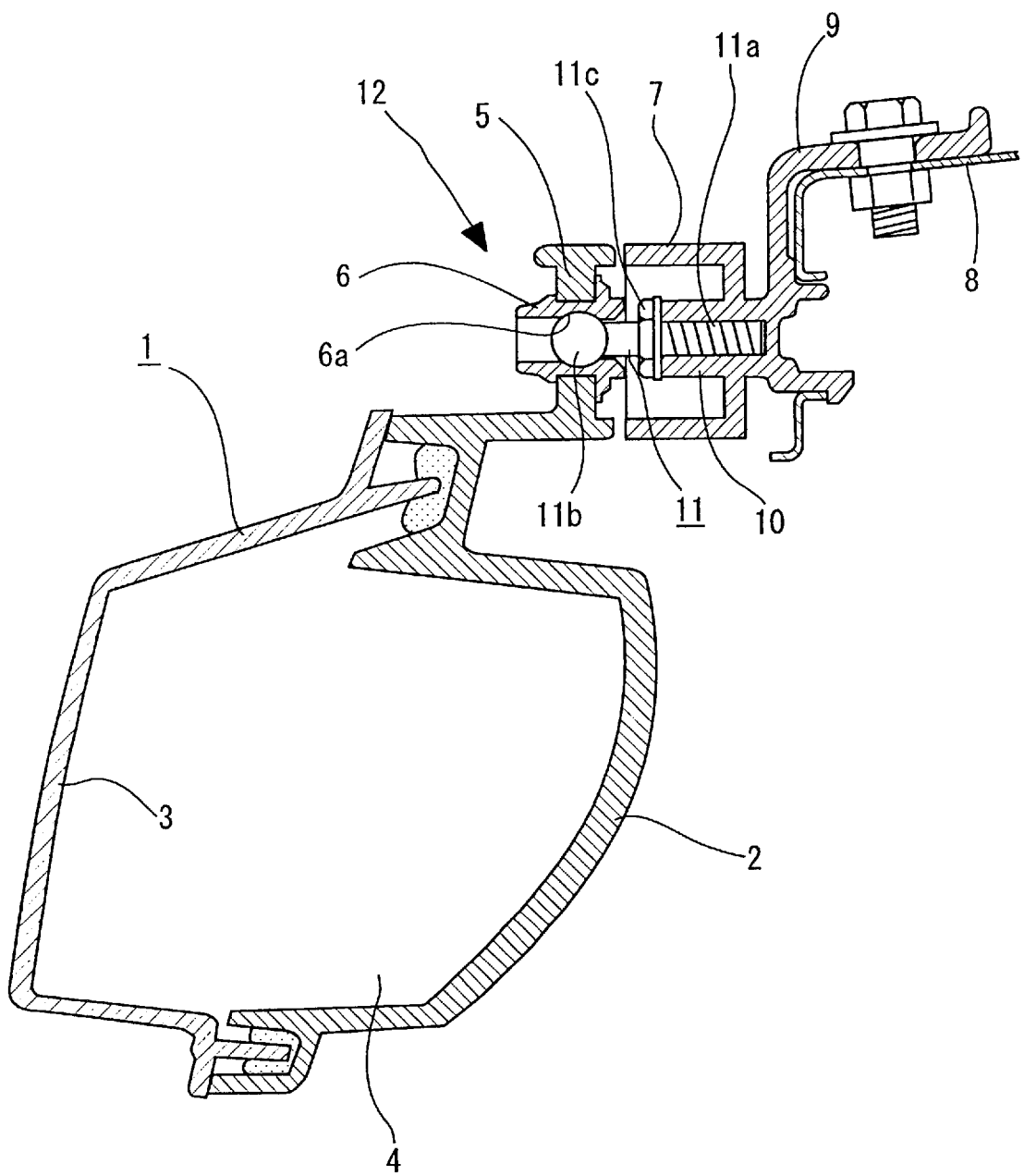
FIG. 2 is a cross sectional view of an essential portion of a modified pivot structure of the present invention.

FIG. 2 shows another embodiment of the present invention.

In this embodiment, the projecting wall 7 is not formed to project from the headlamp unit 1. Instead, the projecting wall 7 is formed to project forward from the area around the screw receiving portion 10 of the mounting bracket 9. In other words, the projecting wall 7 that is substantially a cylinder is closed at one end (rear end) and opened at another end (front end), and it covers the operation portion 11c of the fulcrum member 11 with a small space between its front end and the projecting connecting piece 5.

Thus, in this embodiment shown in FIG. 2, the projecting wall 7 of the mounting bracket 9 surrounds the area around the operation portion 11c of the fulcrum member 11. As a result, the user cannot have an access to the operation portion 11c from outside once the headlamp 1 is mounted on the vehicle body 8. Accordingly, it is impossible for the user to change the distance between the headlamp unit 1 and the vehicle body 8.

The shape and structure of the respective elements shown in the above embodiments represent only a few of the various examples of the present invention. The scope of the present invention should not be construed to be limited to the embodiments described above.

As seen from the above, the present invention provides a pivot structure of a vehicle lamp which is tiltably mounted to a vehicle body or to a mounting element of the vehicle body. The pivot structure includes: a fulcrum member that comprises a threaded shaft portion, a spherical portion and an operation portion; a screw receiving portion formed in the vehicle body or in the mounting element so that the threaded shaft portion of the fulcrum member is screwed into the screw receiving portion; a pivot receiving member which is formed in the vehicle lamp and houses the spherical portion of the fulcrum member therein in a rotatable fashion; and a covering member that covers the operation portion of the fulcrum member.

Accordingly, the covering member that covers the operation portion of the fulcrum member prevents the user from making an access to the operation portion of the fulcrum member with a tool once the lamp is mounted to the vehicle body. The irradiation angle of the vehicle lamp is thus not changed by the user.

In the present invention, the covering member is a projecting wall that is formed on the vehicle headlamp and covers the outer periphery of the operation portion of the fulcrum member. Instead, the covering member can be a projecting wall that is formed on the vehicle body or the mounting element of the vehicle body so as to cover the outer periphery of the operation portion of the fulcrum member. Accordingly, the structure of present invention can be employed without changing any portion of the vehicle body.

What is claimed is:

1. A pivot structure of a vehicle lamp, which is titably mounted to a vehicle body, said pivot structure comprising:

a fulcrum member that comprises a threaded shaft portion, a spherical portion, and an operation portion with which a tool for rotating said operation portion is brought into contact;

a screw receiving portion into which said threaded shaft portion of said fulcrum member is screwed, said screw receiving portion being formed in said vehicle body;

a pivot receiving member which rotatably houses said spherical portion of said fulcrum member, said pivot receiving member being formed in said vehicle lamp; and a covering member provided to cover said operation portion of said fulcrum member for inhibiting access to said operation portion, said covering member comprising a wall surrounding said fulcrum member and extending between said pivot receiving member and said screw receiving portion over said operation portion whereby access to said operation portion is inhibited.

2. The pivot structure of a vehicle lamp according to claim 1, wherein said covering member is a projecting wall that is formed on said vehicle lamp and covers an outer periphery of said operation portion of said fulcrum member.

3. The pivot structure of a vehicle lamp according to claim 1, wherein said covering member is a projecting wall that is formed on said vehicle body and covers an outer periphery of said operation portion of said fulcrum member.

4. A pivot structure of a vehicle lamp which is titably mounted to a mounting element of a vehicle body, said pivot structure comprising:

a fulcrum member that comprises a threaded shaft portion, a spherical portion, and an operation portion with which a tool for rotating said operation portion is brought into contact;

a screw receiving portion into which said threaded shaft portion of said fulcrum member is screwed, said screw receiving portion being formed in said mounting element of said vehicle body;

a pivot receiving member which rotatably houses said spherical portion of said fulcrum member, said pivot receiving member being formed in said vehicle lamp; and a covering member provided to cover said operation portion of said fulcrum member for inhibiting access to said operation portion, said covering member comprising a wall surrounding said fulcrum member and extending between said pivot receiving member and said screw receiving portion over said operation portion whereby access to said operation portion is inhibited.

5. The pivot structure of a vehicle lamp according to claim 4, wherein said covering member is a projecting wall that is formed on said vehicle lamp and covers an outer periphery of said operation portion of said fulcrum member.

6. The pivot structure of a vehicle lamp according to claim 4, wherein said covering member is a projecting wall that is formed on said mounting element of said vehicle body and covers an outer periphery of said operation portion of said fulcrum member.

7. A pivot structure of a vehicle lamp tiltably mounted on a vehicle body, comprising:

a screw receiving element provided on said vehicle body;

a fulcrum member which is a single body comprising a spherical portion, an operating portion and a threaded shaft portion which is screw-engaged with said screw receiving element;

a pivot receiving member provided on said vehicle lamp so as to pivotally hold therein said spherical portion of said fulcrum member; and a projecting wall of substantially a cylindrical shape provided to cover said operation portion of said fulcrum member so as not to allow an access of an operating tool to said operating portion of said fulcrum member.

8. The pivot structure according to claim 7, wherein said projecting wall is provided on said vehicle lamp.

9. The pivot structure according to claim 7, wherein said projecting wall is provided on said vehicle body.

* * * * *